(12) United States Patent
Wakitani

(10) Patent No.: US 9,531,080 B2
(45) Date of Patent: Dec. 27, 2016

(54) PHASE CONVERSION DEVICE FOR ELECTROMAGNETIC WAVE

(71) Applicant: Kiyotaka Wakitani, Kawasaki (JP)

(72) Inventor: Kiyotaka Wakitani, Kawasaki (JP)

( * ) Notice: Subject to any disclaimer, the term of this patent is extended or adjusted under 35 U.S.C. 154(b) by 8 days.

(21) Appl. No.: 14/654,968

(22) PCT Filed: Jan. 25, 2013

(86) PCT No.: PCT/JP2013/051624
§ 371 (c)(1),
(2) Date: Jun. 23, 2015

(87) PCT Pub. No.: WO2014/115312
PCT Pub. Date: Jul. 31, 2014

(65) Prior Publication Data
US 2015/0333410 A1    Nov. 19, 2015

(51) Int. Cl.
*H01Q 15/24*     (2006.01)
*H01Q 1/52*      (2006.01)
*G02B 5/30*      (2006.01)
*H01Q 17/00*     (2006.01)
*H01Q 15/00*     (2006.01)
*H01Q 19/06*     (2006.01)
*H01Q 3/46*      (2006.01)

(52) U.S. Cl.
CPC .......... *H01Q 15/244* (2013.01); *G02B 5/3083* (2013.01); *H01Q 1/526* (2013.01); *H01Q 17/00* (2013.01); *H01Q 3/46* (2013.01); *H01Q 15/0006* (2013.01); *H01Q 19/062* (2013.01)

(58) Field of Classification Search
CPC ..... H01Q 15/0006; H01Q 19/062; H01Q 3/46

USPC .......................................... 343/909, 753, 754
See application file for complete search history.

(56) References Cited

U.S. PATENT DOCUMENTS

| 6,812,903 B1 | 11/2004 | Sievenpiper et al. ........ 343/753 |
| 7,335,993 B2 | 2/2008 | Anzai ........................... 257/777 |
| 2003/0108207 A1* | 6/2003 | Otsuka ..................... H04S 3/00 381/1 |

FOREIGN PATENT DOCUMENTS

| JP | 10-68816 A | 3/1998 |
| JP | 2002-290303 A | 10/2002 |
| JP | 2002-299880 A | 10/2002 |
| JP | 2004-500776 A | 1/2004 |

(Continued)

OTHER PUBLICATIONS

International Search Report dated Apr. 23, 2014, issued by WIPO in connection with International Application No. PCT/JP2013/051624.

*Primary Examiner* — Joseph Lauture
(74) *Attorney, Agent, or Firm* — Fitzpatrick, Cella, Harper & Scinto

(57) ABSTRACT

A phase conversion device, which converts an electromagnetic wave into a right-handed circularly polarized wave and a left-handed circularly polarized wave to attenuate electric and magnetic effects, includes first, second, and third layers. The first layer includes a ½ lambda wavelength plate. The second layer includes a ¼ lambda wavelength plate. The third layer includes a ½ lambda wavelength plate. The device is effective to reduce an influence of the electromagnetic wave on an electric field and a magnetic field. The device may be portable and useable to reduce an influence of electromagnetic waves on a human body.

6 Claims, 7 Drawing Sheets

(56) References Cited

FOREIGN PATENT DOCUMENTS

| JP | 2004-079763 A | 3/2004 |
|----|---------------|--------|
| JP | 2006-119492 A | 5/2006 |
| JP | 2009-258738 A | 11/2009 |

* cited by examiner

PHASE CONVERSION DEVICE FOR ELECTROMAGNETIC WAVE

TECHNICAL FIELD

The present invention relates to a device for subjecting an electromagnetic wave of a subject to phase conversion to reduce electric and magnetic influences which are affected by the electromagnetic wave of the above-described subject.

BACKGROUND ART

Electromagnetic waves still continue to increase due to so-called factors, such as progress of all electrification, spread of hybrid cars or personal computers, and transition to ground digitization, which overlap each other. It has been officially known that there is no actual harm in such electromagnetic waves. However, information obtained through the Internet is not always positive with respect to the electromagnetic waves and there are many reports abroad that mobile phones are harmful. Moreover, many books that discuss the harmfulness of the electromagnetic waves have been published. In addition, a report that the electromagnetic waves are harmful has also been released by the WHO. It is often seen that one's shoulder becomes stiff and the eyes become fatigued when using a personal computer. However, there is also a tendency that the muscles become stiff and the cerebral blood flow is reduced due to the electromagnetic waves.

In this manner, the fact that electromagnetic waves are hardly regulated while there is a concern of an influence of the electromagnetic waves on human bodies is caused by unclear objective evidence. However, there is also a method, such as an O-ring test, through which it is possible to immediately recognize a reaction if the electromagnetic waves are harmful. The O-ring test relates to an invention of Dr. Yoshiaki Omura. In the O-ring test, a subject forms a ring (that is, an O-ring) by matching fingertips of the thumb and another finger; the other hand is placed near a lesion area of the subject; the change in ability of the subject to close the ring is examined while an examiner tries to separate the fingers of the subject which forms the above-described ring to look for any abnormality of the lesion area. The invention corresponds to a technique which has not been patented by the provisions of the Patent Law in Japan, but is famous due to acquisition of U.S. Pat. No. 5,188,107, and it can be said that its accomplishment is remarkable.

The present inventors have verified the O-ring test and obtained information that there may be a certain unpreferable influence of an electromagnetic wave on a human body in light of experience and observation in the position as dentists, and as a result, the present invention has been developed. As prior art which has been found during the process of development and research, for example, there is an invention of an electromagnetic wave shielding antenna element and an electromagnetic wave shielding body using the same which is disclosed in JP-A-2002-299880. The invention is configured such that a minute dipole antenna element, which has a sufficiently short length with respect to the wavelength of the electromagnetic wave to be shielded, and a minute loop antenna, which has a sufficiently short circumference with respect to the wavelength of the electromagnetic wave to be shielded, are combined to generate a circularly polarized wave or an elliptically polarized wave; these antennas are disposed so as to form a pair; and the currents of the antenna elements become reverse phases. As a result of double-checking the invention, it has been recognized that there is a certain effect, but at the same time, it has also been recognized that the effect is not significant. Furthermore, the present inventors have completed the present invention by conducting studies in order to reduce influences of the electromagnetic wave on an electric field and a magnetic field.

Patent Document 1: JP-A-2002-299880

BRIEF DESCRIPTION OF EMBODIMENTS OF THE INVENTION

Problem that the Invention is to Solve

The present invention has been made in consideration of the above-described points, and an object of the present invention is to provide a phase conversion device for an electromagnetic wave which can reduce an influence of the electromagnetic wave on an electric field and a magnetic field. In addition, another object of the present invention is to provide a portable device in order to reduce an influence of the electromagnetic wave on a human body.

Means to Solve the Problem

The present invention has been made to solve the problem and relates to a phase conversion device which converts an electromagnetic wave into a right-handed circularly polarized wave and a left-handed circularly polarized wave and reduces electric and magnetic influences, and is provided with means such that the device is constituted of three layers in which a first layer includes a ½ lambda wavelength plate, a second layer includes a ¼ lambda wavelength plate, and a third layer includes a ½ lambda wavelength plate. It is considered that it is possible to convert an electromagnetic wave, which is output from an electrical machine, into right-handed and left-handed circularly polarized waves by passing the electromagnetic wave through a ½ lambda wavelength plate as a first layer, a ¼ lambda wavelength plate as a second layer, and a ½ lambda wavelength plate as a third layer. Accordingly, it has been found that it is possible to obtain a favorable result in an O-ring test if the phase conversion device is attached to a device, such as an electrical machine, which generates an electromagnetic wave. It can be confirmed in the O-ring test that the result is minus (harmful) if the above-described O-ring is opened and the result is plus (beneficial) if the O-ring is closed due to the electromagnetic wave. If the result is minus, so-called symptoms such as stiff shoulders, asthenopia, loss of flexibility in the muscles, and decrease in cerebral blood flow can be found. It is considered that the electromagnetic wave acts on the O-ring test toward the plus side due to the circularly polarized wave. For this reason, it is considered that it is possible to reduce the influence of the electromagnetic wave. However, there is a concern that the result depends on the skill of an examiner in the O-ring test. Therefore, a well-known wave motion measuring device which can measure the same effect as that of the O-ring test is used. The device measures a wave motion which is output from a living body, and the numerical value decreases when there is an unpreferable influence on the body and the numerical value increases when there is a preferable influence on the body. It has been found that if the device according to the present invention is attached to an electrical machine which generates an electromagnetic wave, the effect of the wave motion measuring device comes to have a favorable value.

Here, the ½ lambda wavelength plate refers to provision of a phase difference π (180 degrees), and it is considered that it is possible to convert the vibration direction of an electromagnetic wave which is a linearly polarized wave. In addition, the ¼ lambda wavelength plate refers to provision of a phase difference π/2 (90 degrees), and it is considered that it is possible to convert the vibration direction of an electromagnetic wave into a circularly polarized wave. In addition, the ½ lambda wavelength plate refers to provision of a phase difference π (180 degrees), and it is considered that it is possible to convert the vibration direction of an electromagnetic wave which has been converted into the circularly polarized wave. For example, it is considered that it is possible to convert the direction of an electromagnetic wave, which has been turned to the right through the ¼ lambda wavelength plate in a second wavelength plate, into a left-turned circularly polarized wave. Accordingly, it is considered that the electromagnetic wave, which has passed through the phase conversion device and is incident on the first layer side or the third layer side, is converted into a right-turned or left-turned electromagnetic wave. It is considered that the right-turned or left-turned electromagnetic wave has a preferable influence on the body.

In order to solve the above-described problem, the device according to the present invention is provided with means such that the device is constituted of three layers and the ½ lambda wavelength plates in the first and third layers are replaced with transparent members and the second layer includes the ¼ lambda wavelength plate. The transparent member referred to herein is, for example, a quartz plate, cellophane, or OPP tapes. In addition, the transparent member has a favored numerical value with respect to the wave motion measuring device. When using a quartz plate, it is possible to configure the quartz plate so as to have an effect equivalent to that of the ½ lambda wavelength plate depending on the thickness. In addition, the OPP tape is an abbreviation for oriented polypropylene tape and is referred to as tape in which a polypropylene material is made into a transparent film through melt extrusion molding, is coated with an adhesive agent, and then extends. It is possible to configure the tape so as to have an effect equivalent to the ½ lambda wavelength plate or the ¼ lambda wavelength plate depending on the extending direction to be described later.

In order to solve the above-described problem, the device according to the present invention is provided with means such that all of the first to third layers are composed of transparent members. The transparent member referred to herein is, for example, a quartz plate, cellophane, or OPP tapes as described above. It is considered that the transparent member of the first layer is equivalent to the ½ lambda wavelength plate, the transparent member of the second layer is equivalent to the ¼ lambda wavelength plate, and the transparent member of the third layer is equivalent to the ½ lambda wavelength plate. Moreover, the transparent members have favorable numerical values with respect to the wave motion measuring device. The OPP tape extends in one direction. It is considered that due to the directivity processed by the OPP tape, it is possible to exhibit an effect equivalent to that of the ¼ lambda wavelength plate as well as to exhibit an effect equivalent to that of the ½ lambda wavelength plate as described above, using the direction. It is already known that when using a quartz plate or polycarbonate, it is possible to configure the quartz plate or polycarbonate so as to have an effect equivalent to that of the ½ lambda wavelength plate and an effect equivalent to that of the ¼ lambda wavelength plate depending on the thickness.

The present invention is provided with means such that two phase conversion devices described above are disposed and first layers in the respective two phase conversion devices are connected to each other through a conductive wire portion. It is considered that, with the provision of such means, it is possible to reduce an influence of an electromagnetic wave in a wider range compared to the case where there is a single phase conversion device. Moreover, the means has a favorable numerical value with respect to the wave motion measuring device to be described later. Copper can be used as the conductive wire portion.

The present invention is provided with means such that two phase conversion devices are disposed, first layers in the respective two phase conversion devices are connected to each other through a conductive wire portion, and a substance is disposed between the two phase conversion devices. It is considered that, with the provision of such means, it is possible to reduce an influence of an electromagnetic wave in a wider range and to reduce an influence of an electrical machine covering a wide range. Moreover, the means has a favorable numerical value with respect to the wave motion measuring device. In addition, the substance referred to herein is, for example, vitamins, minerals, and supplements. It is said that the influence of an electromagnetic wave can be reduced only by these substances. Moreover, the means has a favorable numerical value with respect to a wave motion measuring device which is interposed therebetween.

In addition, the phase conversion device for the present invention is provided with means such that a placement portion which is constituted of a conductor is disposed on an upper portion of the above-described phase conversion device. The placement portion is composed of copper, and copper foil is mainly used therefor. In addition, two types of placement portions can be used. A first placement portion has a hexagon-like external shape in which an upper right angle and a lower left angle are removed from a tetragon between angles positioning opposite to each other. A second placement portion also has a hexagon-like external shape in which an upper left angle and a lower right angle are removed from a tetragon between angles positioning opposite to each other. It is considered that with disposition of the first placement portion and the second placement portion separately from each other or together on the upper portion of the phase conversion device, it is possible to set an electromagnetic wave of a left-handed circularly polarized wave or an electromagnetic wave of a right-handed circularly polarized wave even at a relatively distant location. The result of the wave motion measuring device of the phase conversion device is favorable, as described later. Accordingly, it is considered that the first placement portion and the second placement portion play a role as an antenna.

The present invention is configured and acts as described above, and therefore, it is possible to obtain a significant effect of reducing the electric and magnetic influences which are affected by an electromagnetic wave by converting the phase of a target electromagnetic wave. In addition, according to the present invention, it is possible to reduce the influence of the electromagnetic wave on a human body. In addition, it is possible to provide a portable small device of converting the electromagnetic wave.

BRIEF DESCRIPTION OF THE DRAWINGS

Hereinafter, the present invention will be described in more detail with reference to the embodiment shown in the drawings.

Figure 2:
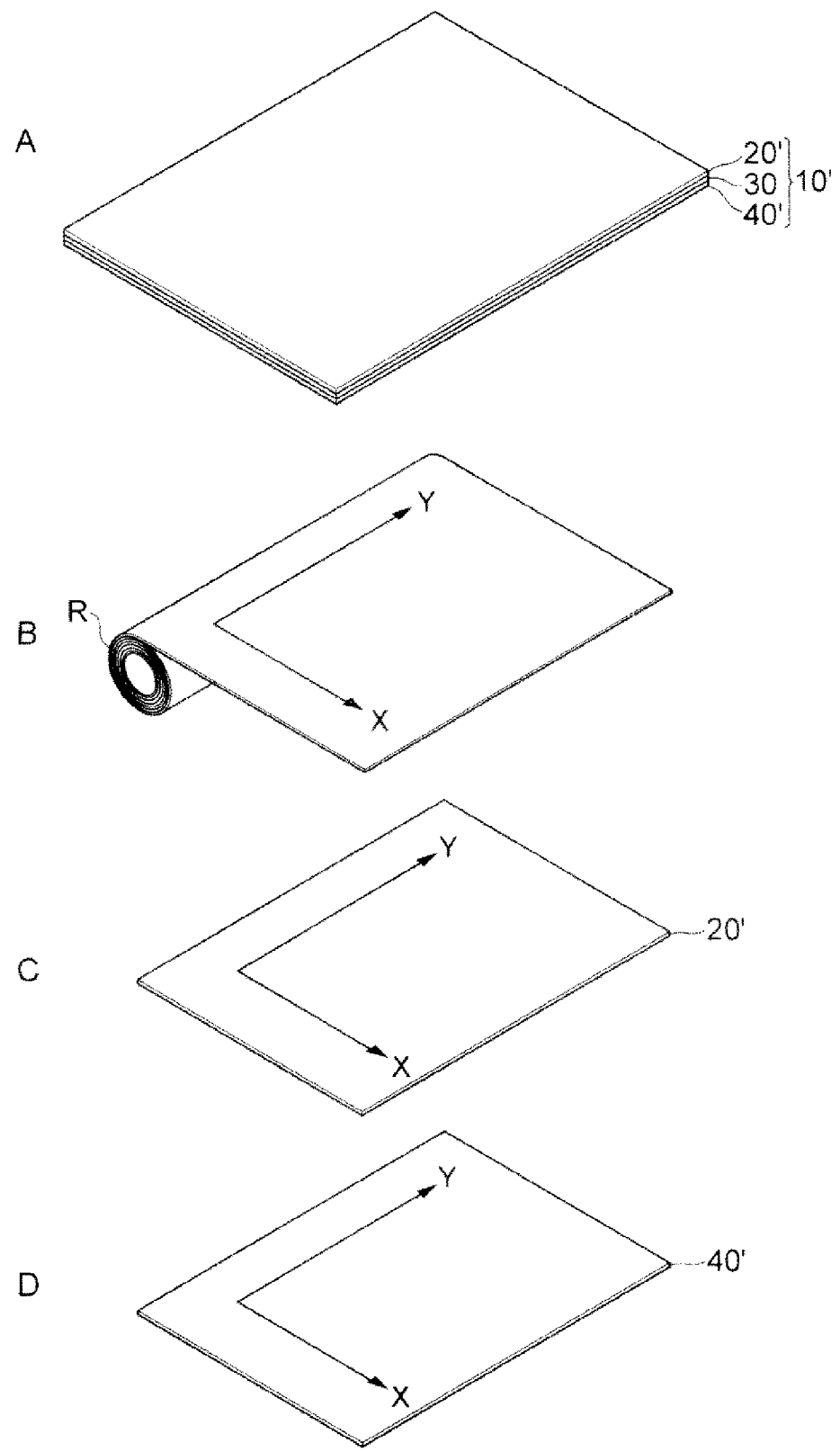

A of FIG. 2 is a perspective view of another Example of a phase conversion device for an electromagnetic wave according to the present invention.

B of FIG. 2 is a state view in which a sheet is drawn from a roll.

C of FIG. 2 is a perspective view of a transparent member.

D of FIG. 2 is a perspective view of a transparent member.

Figure 3:
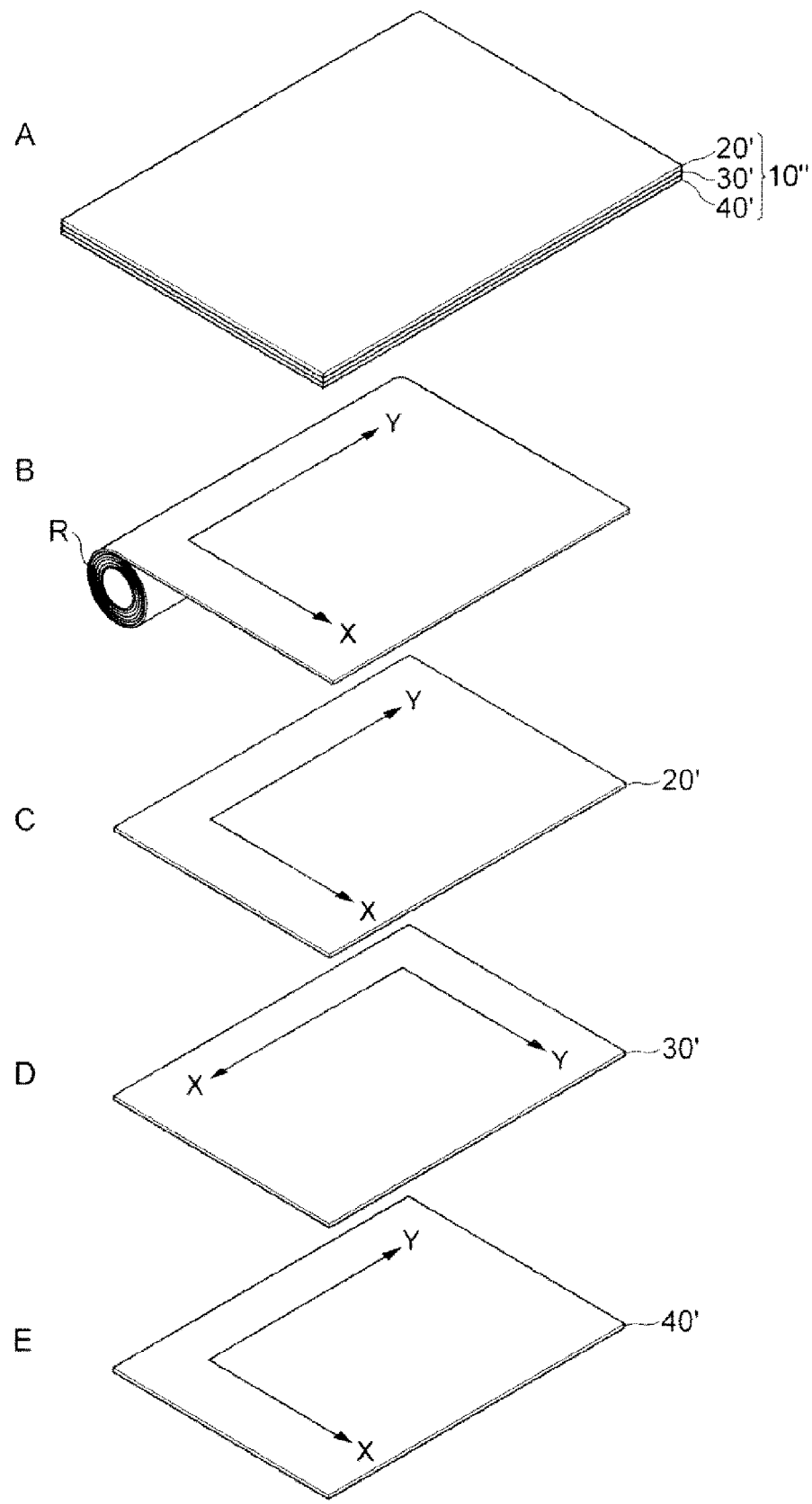

A of FIG. 3 is a perspective view of still another example of a phase conversion device for electromagnetic wave according to the present invention.

B of FIG. 3 is a state view in which a sheet is drawn from a roll.

C of FIG. 3 is a perspective view of a transparent member.

D of FIG. 3 is a perspective view of a transparent member.

E of FIG. 3 is a perspective view of a transparent member.

Figure 4:
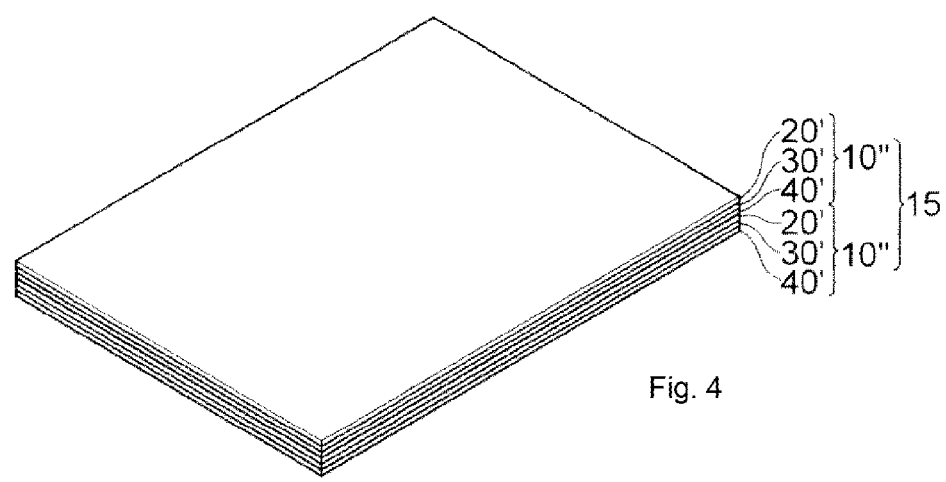

FIG. 4 is a perspective view of still another example of a phase conversion device for an electromagnetic wave according to the present invention.

Figure 5:
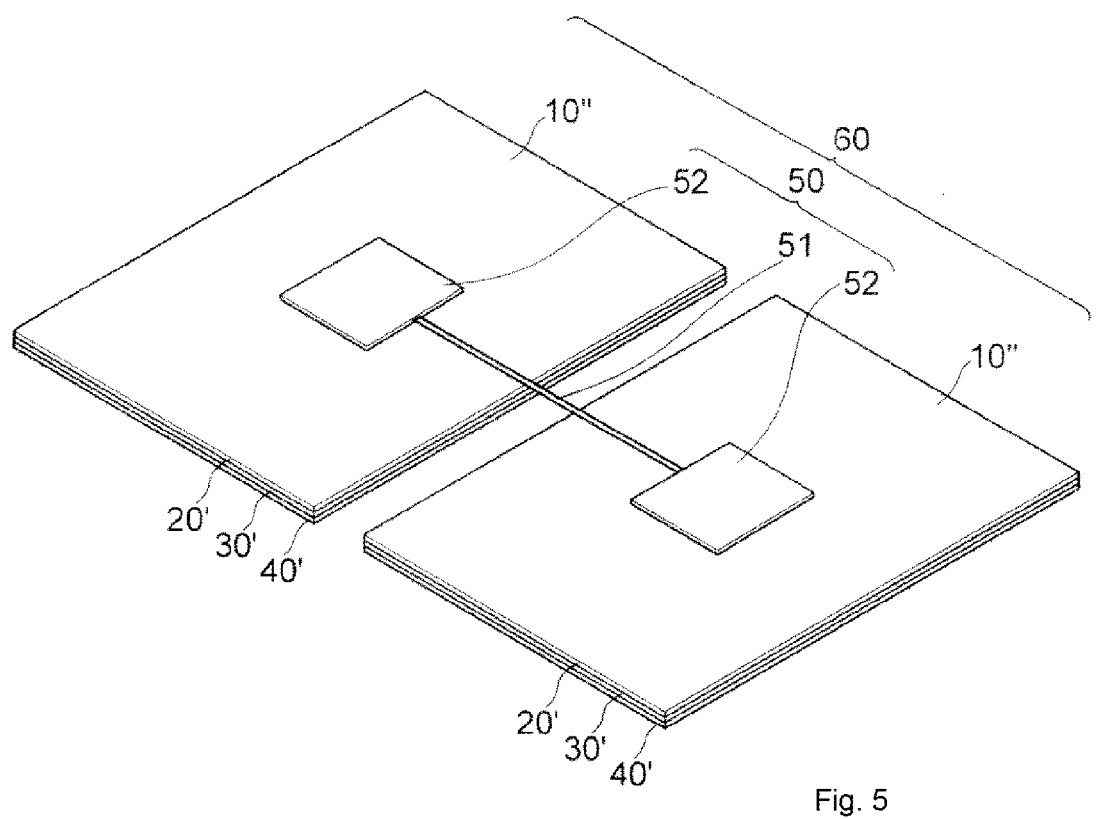

FIG. 5 is a perspective view of an example in which phase conversion devices for electromagnetic waves according to the present invention are connected to each other through a conductive wire.

Figure 6:
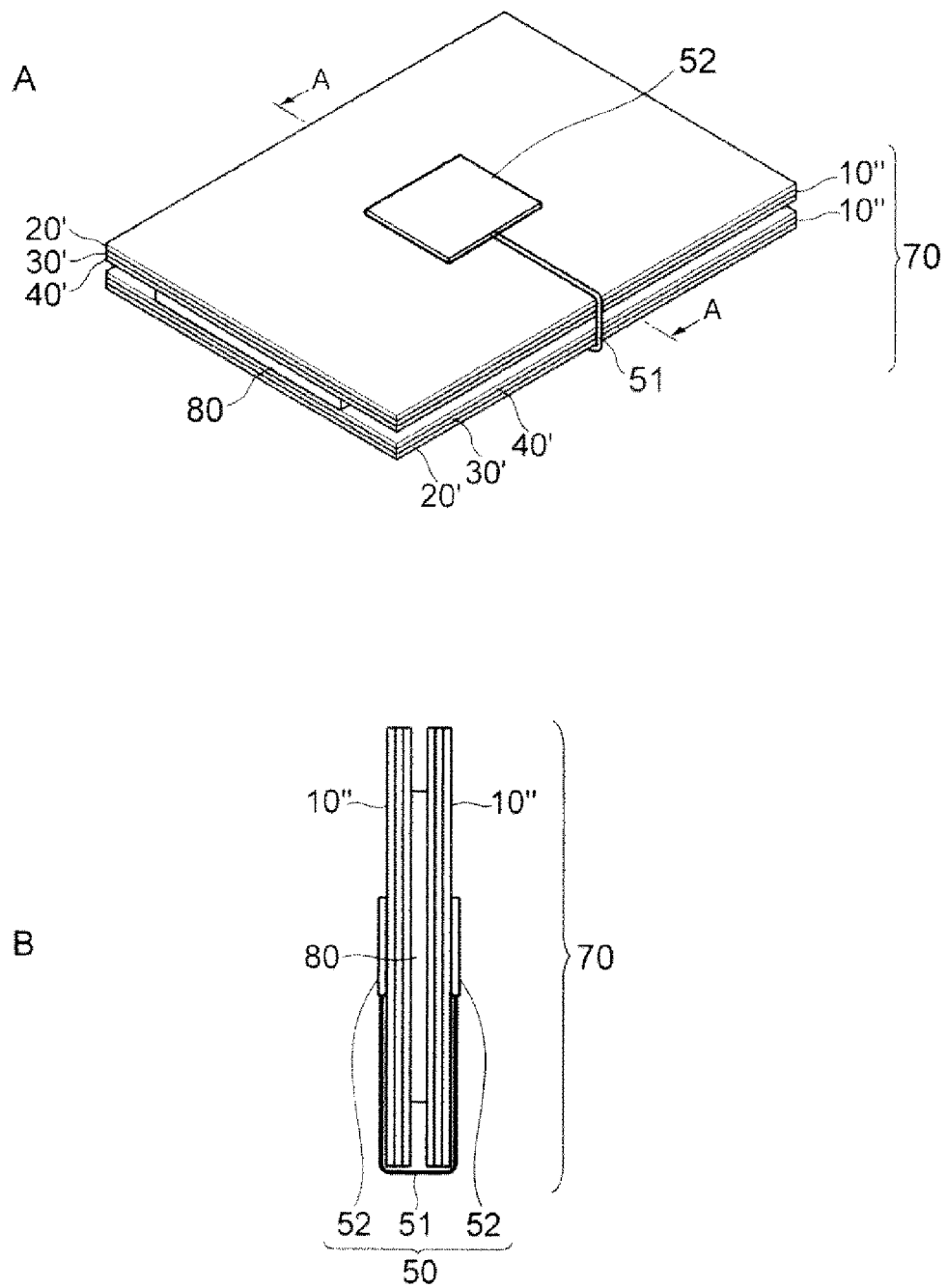

A of FIG. 6 is a perspective view of an example in which phase conversion devices for electromagnetic waves according to the present invention are connected to each other through a conductive wire and a substance is disposed between the phase conversion devices.

B of FIG. 6 is a cross-sectional view taken along line A-A in A of FIG. 6.

Figure 7:
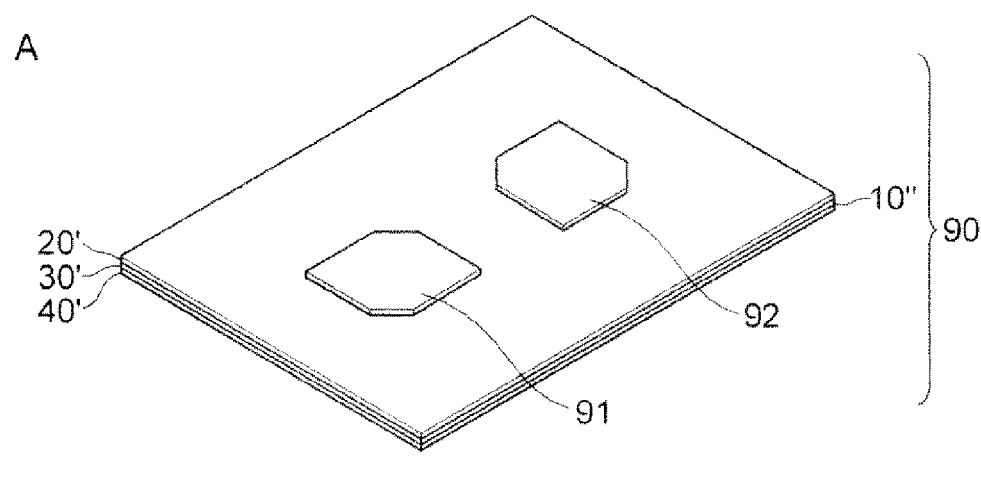
Figure 7:
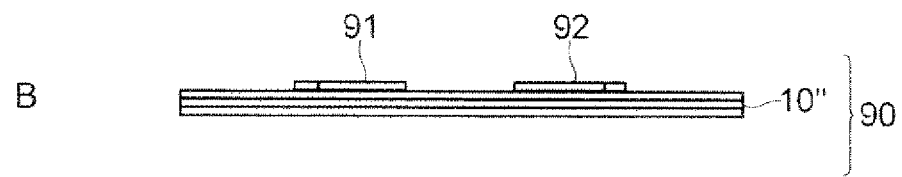

A of FIG. 7 is a perspective view of still another example of a phase conversion device for an electromagnetic wave according to the present invention.

B of FIG. 7 is a side surface view of A of FIG. 7.

Figure 8:
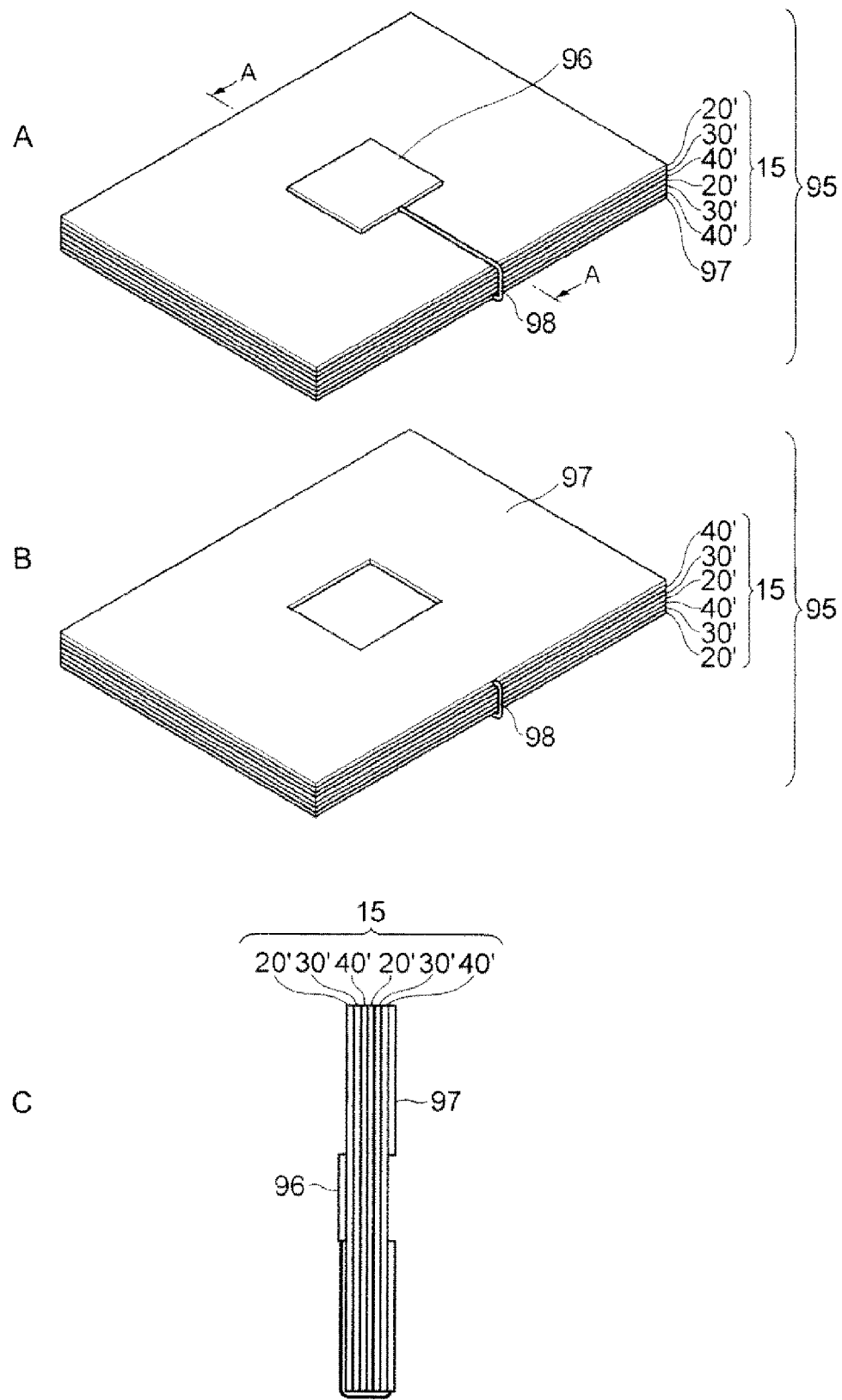

A of FIG. 8 is a perspective view of a phase conversion device of still another example.

B of FIG. 8 is a perspective view on a rear side of the phase conversion device of the still another example.

C of FIG. 8 is a cross-sectional view taken along line A-A of A of FIG. 8.

DETAILED DESCRIPTION OF EMBODIMENTS OF THE INVENTION

A phase conversion device 10 is constituted of three layers in which a first layer is constituted of a ½ lambda wavelength plate 20. It is known that the ½ lambda wavelength plate 20 rotates a polarization plane of an electromagnetic wave by 90 degrees. A second layer is constituted of a ¼ lambda wavelength plate 30. It is known that the ¼ lambda wavelength plate 30 converts an incident linearly polarized wave into a circularly polarized wave. Furthermore, a third layer 40 is constituted of a ½ lambda wavelength plate which can reversely convert the circularly polarized electromagnetic wave in the ¼ lambda wavelength plate. That is, when the circularly polarized electromagnetic wave is a right-turned circularly polarized wave, the right-turned circularly polarized wave is converted into a left-turned circularly polarized wave. Accordingly, the electromagnetic wave incident on the ½ lambda wavelength plate 20 of the first layer becomes a left-turned circularly polarized wave through the ¼ lambda wavelength plate 30 of the second layer and the ½ lambda wavelength plate 40 of the third layer. In contrast, the electromagnetic wave incident on the ½ lambda wavelength plate 40 of the third layer becomes a right-turned circularly polarized wave through the ½ lambda wavelength plate 20 of the first layer and the ¼ lambda wavelength plate 30 of the second layer. Accordingly, it is considered that the polarization plane of the electromagnetic wave is rotated by 90 degrees in the ½ lambda wavelength plate 20 in the first layer, and the linearly polarized wave is converted into a circularly polarized wave, in which the polarization plane of the electromagnetic wave is rotated by 90 degrees, in the ¼ lambda wavelength plate 30 of the second layer. In addition, it is considered that it is possible to reversely convert the electromagnetic wave, which is circularly polarized in the ¼ lambda wavelength plate 30 of the second layer, in the ½ lambda wavelength plate 40 of the third layer. A commercially available ½ lambda wavelength plate or ¼ lambda wavelength plate can be used. In addition, the ½ lambda wavelength plate 20 is equivalent to two sheets of ¼ lambda wavelength plates 30 which overlap to each other. Accordingly, it is considered that the same effect can be exhibited by overlapping 5¼ lambda wavelength plates 30 in total (not shown in the drawing) by setting two ¼ lambda wavelength plates 30 instead of the ½ lambda wavelength plate 20 of the first layer, further overlapping a ¼ lambda wavelength plate 30 of the second layer, and overlapping two ¼ lambda wavelength plates 30 instead of the ½ lambda wavelength plate 40 of the third layer.

In addition, a phase conversion device 10' is a device in which transparent members 20' and 40' are used instead of the ½ lambda wavelength plate 20 of the first layer and the ½ lambda wavelength plate 40 of the third layer in the phase conversion device 10. Examples of the transparent member include a quartz plate. In addition, polycarbonate, cellophane, or OPP tape can be used. When using a quartz plate or polycarbonate, it is well known that it is possible to make a ½ lambda wavelength plate or a ¼ lambda wavelength plate by changing the thickness thereof. In addition, when using cellophane or OPP tape which extends in one direction as described above, in a case where, for example, the extending one direction is set to an X direction and a direction perpendicular to the X direction is set to a Y direction, the transparent members 20' and 40' of the first and third layers overlap each other by aligning the directions thereof in an identical X direction. That is, cellophane or OPP tape is commercially available by being wound around a cylinder, that is, in a form of a roll R. The radial direction in the roll R is defined as the X direction and the thrust direction in the roll R is defined as the Y direction. In this state, the cellophane or the OPP tape is made into a sheet shape by being drawn from the roll R. The cellophane or the OPP tape which has been made into the sheet shape is set to the transparent members 20' and 40' of the first and third layers. The transparent members 20' and 40' of the first and third layers are set such that each X direction which is defined as the radial direction in the case of the roll R state is combined and the wavelength plate 30 of the second layer is disposed therebetween (refer to FIG. 2).

In addition, a phase conversion device 10" is also a device in which transparent members 20' and 40' are used instead of the ½ lambda wavelength plate 20 of the first layer and the ½ lambda wavelength plate 40 of the third layer in the phase conversion device 10. Examples of the transparent member include a quartz plate. In addition, polycarbonate, cellophane, or OPP tape can be used. When using a quartz plate or polycarbonate, it is well known that it is possible to make a ½ lambda wavelength plate or a ¼ lambda wavelength plate by changing the thickness thereof. In addition, when using cellophane or OPP tape which extends as described above, in a case where the extending direction is set to an X direction and a direction perpendicular to the X direction is set to a Y direction, the transparent members 20' and 40' of the first and third layers overlap each other by aligning the directions thereof in an identical X direction. That is, cellophane or OPP tape is commercially available by being wound around a cylinder, that is, in a state of a roll R. The radial direction in the roll R is defined as the X direction and the thrust direction in the roll R is defined as the Y direction. In this state, the cellophane or the OPP tape is made into a sheet shape by being drawn from the roll R. The cellophane or the OPP tape which has been made into the sheet shape is set to the transparent members 20' and 40' of the first and third layers. The transparent members 20' and 40' of the first and third layers are set such that each X direction which is defined as the radial direction in the case of the roll R state is combined. Accordingly, the transparent members 20' and 40' of the first and third layers are equivalent to each other. Either of the transparent members 20' and 40' may be set to the first layer to obtain the same effect. A transparent member 30' may be disposed therebetween instead of the wavelength plate 30 of the second layer. Even in regard to the transparent member 30', cellophane or OPP tape is commercially available by being wound around a cylinder, that is, in a state of a roll R. The thrust direction in the roll R is defined as the Y direction. In this state, the cellophane or the OPP tape is made into a sheet shape by being drawn from the roll R. The cellophane or the OPP tape which has been made into the sheet shape is set to the transparent member 30' of the second layer. The Y direction of the transparent member 30', which has been defined as the thrust direction in the case of being made into the roll shape, and the X direction of the transparent members 20' and 40' of the first and third layers are made to coincide with each other, and the transparent member 30' is disposed between the transparent members 20' and 40'. Accordingly, the phase conversion device 10" becomes a device in which the X direction of the transparent member 20' of the first layer, the Y direction of the transparent member 30' of the second layer, and the X direction of the transparent member 40' of the third layer are aligned and the transparent member 20', the transparent member 30', and the transparent member 40' overlap each other (refer to FIG. 3).

In addition, it is possible to set a phase conversion device 15 in which two phase conversion devices 10" overlap each other. That is, a phase conversion device 10", in which the X direction of the transparent member 20' of the first layer, the Y direction of the transparent member 30' of the second layer, and the X direction of the transparent member 40' of the third layer are aligned and the transparent members 20', 30', and 40' overlap each other, is disposed at an upper portion or a lower portion of a phase conversion device 10", in which the X direction of the transparent member 20' of the first layer, the Y direction of the transparent member 30' of the second layer, and the X direction of the transparent member 40' of the third layer are aligned and the transparent members 20', 30', and 40' overlap each other (refer to FIG. 4).

A phase conversion device 60 is a device in which the first layers in the phase conversion devices 10" and 10" are connected to each other through a conductive wire portion 50. The conductive wire portion 50 preferably conducts electricity and is preferably a copper wire, copper foil, and silver foil. In addition, as described above, the transparent members 20' and 40' of the first and third layers are equivalent to each other and either of the transparent members 20' and 40' may be set to the first layer to obtain the same effect. In addition, with the configuration in which the first layers in the phase conversion devices 10" and 10" are connected to each other through the conductive wire portion 50, it is possible to expand the range within which it is possible to reduce the influence of the electromagnetic wave. The conductive wire portion 50 is constituted of a wire portion 51 and fixing portions 52 and 52. The fixing portions 52 and 52 are disposed on the first layers 20" and 20" in the phase conversion devices 10" and 10". The result of the wave motion measuring device will be described later. In addition, a phase conversion device in which the phase conversion devices 10 and 10 are combined through the conductive wire portion 50 or a phase conversion device in which the phase conversion devices 10' and 10' are connected to each other through the conductive wire portion 50 is also preferable.

A phase conversion device 70 is a device in which the first layers in the phase conversion devices 10" and 10" are connected to each other through the conductive wire portion 50, the phase conversion devices 10" and 10" overlap each other, and a substance 80 is inserted between the phase conversion devices 10" and 10". The substance referred to herein is, for example, vitamins minerals, and supplements, and *Pueraria mirifica* is suitable. In addition, the conductive wire portion 50 preferably conducts electricity and is preferably a copper wire and copper foil similarly to the above. The result of the wave motion measuring device will be described later. In addition, the transparent members 20' and 40' of the first and third layers are equivalent to each other and either of the transparent members 20' and 40' may be set to the first layer to obtain the same effect as all described above. Furthermore, a device, in which the phase conversion devices 10 and 10 are combined through the conductive wire portion 50, the phase conversion devices 10 and 10 overlap each other, and the substance 80 is inserted between the phase conversion devices 10 and 10, or a device in which the phase conversion devices 10' and 10' are connected to each other through the conductive wire portion 50, the phase conversion devices 10' and 10' overlap each other, and the substance 80 is inserted between the phase conversion devices 10' and 10' is also preferable.

In addition, a phase conversion device 90 as still another example is a device in which placement portions 91 and 92, which are constituted of conductors, are disposed at an upper portion of the first layer in the phase conversion device 10" which has already been described. The conductor is preferably composed of copper. In addition, the transparent members 20' and 40' of the first and third layers are equivalent to each other and either of the transparent members 20' and 40' may be set to the first layer to obtain the same effect. In addition, the placement portion 91 has almost a hexagon shape. That is, the placement portion 91 has a shape in which angles of the upper right portion and the lower left portion which are disposed opposite to each other are removed from two pairs of angles formed of an upper right portion and a lower left portion or an upper left portion and a lower right portion, from a tetragon shape. In addition, the placement portion 92 has a shape in which other angles of the upper left portion and the lower right portion which are disposed opposite to each other are removed from two pairs of the angles formed of the upper right portion and the lower left portion or the upper left portion and the lower right portion. It is considered that it is possible to reduce the influence of the electromagnetic wave even at a relatively distant location. That is, it is considered that the placement portions 91 and 92 have a function as an antenna. The result of the wave motion measuring device is favorable, as described later.

In addition, in a phase conversion device 95 as still another example, the phase conversion devices 10" and 10" overlap each other, a copper foil portion 96, which has a smaller area than that of the phase conversion device 10, is attached to the upper surface of the phase conversion device. Moreover, the phase conversion device has a copper foil portion 97 which has a configuration in which copper foil is attached to the entire lower surface and the area of the copper foil attached to the upper surface is removed from the area attached to the entire lower surface. That is, the copper foil portion 97 has a so-called windowed shape (refer to FIG. 8). The copper foil portion 96 on the upper surface and the copper foil portion 97 on the lower surface are further connected to each other through a conductive wire 98 in such a state.

As already described above, the O-ring test, as a method of estimating an influence of an electromagnetic wave on a human body, is a method through which it is possible to immediately recognize the reaction if the electromagnetic wave is harmful. That is, the test is a method in which a subject forms a ring (that is, an O-ring) by matching fingertips of the thumb and another finger; the other hand is placed near a lesion area of the subject; the change in force of the subject to close the ring is conjectured while an subject tries to separate the fingers of the subject which forms the above-described ring. However, it is also true that there is a concern that the result of the O-ring test depends on the skill of the examiner. That is, there is a problem in that the result of the examination is subjective and it is difficult to specifically digitalize the change. In contrast, the wave motion measuring device is a device which enables determination whether an electromagnetic wave is favorable, by checking the resonance frequency of a wave motion since there is a unique wave motion in the organs or the like of a human. Therefore, it can be said that the result of the wave motion measuring device is relatively more objective than the above-described O-ring. It is considered that being favorable on a body refers to, for example, phenomena in which the muscles are relaxed and a blood stream is improved. It is considered that wave motion information relating to maintenance of health of a living body is previously input to the wave motion measuring device, and therefore, it is possible to detect turbulence in an energy balance within the body by measuring a wave motion.

The following Table 1 is a measurement result of the wave motion measuring device when using the phase conversion devices 10, 10', and 10". As the wave motion measuring device, "MIRS" which was well-known art and was manufactured by Acty 21, Co., Ltd. was used (similarly to Tables 2 to 5). Tests were performed using mobile phones (for a telephone call) as electrical machines which generate an electromagnetic wave and by attaching the phase conversion devices to the mobile phones. OPP tape was used as a transparent member in each of the phase conversion devices in the following Tables 1 to 5.

In the above-described Table 1, "before experiment A" shows numerical values when each item was measured through the wave motion measuring device in a state where a mobile phone as the electrical machine had not been used. In addition, "use of mobile phone B" shows numerical values measured when a mobile phone was used in a state where a phase conversion device had not been attached to the mobile phone. "Use of mobile phone C" shows values measured when a mobile phone was used (for a telephone call) by attaching a phase conversion device 10 to the mobile phone. Similarly, "use of mobile phone D" shows values measured when a mobile phone was used (for a telephone call) by attaching a phase conversion device 10' to the mobile phone, and "use of mobile phone E" shows values measured when a mobile phone was used (for a telephone call) by attaching a phase conversion device 10" to the mobile phone. Accordingly, the numerical values in each of the "before experiment A" and the "use of mobile phone B" are numerical values which are measured by the wave motion measuring device for comparison when measuring the effect of the present invention.

According to the above-described Table 1, the numerical value when the mobile phone is not used is 12. When the mobile phone is used in a state where the phase conversion device is not attached, the numerical value decreases to 10. Accordingly, it is considered that the use of the mobile phone generates an electromagnetic wave and decreases the function of the body, thereby decreasing the immune function. In this state, when the phase conversion device 10 which is the present invention is attached to the mobile phone, the numerical value increases to 15. When measurement is performed in each item in this manner, the numerical values increase, and there is almost the same tendency in the numerical values even if there are small differences in the numerical values. Accordingly, it is considered that the invention of the present application can increase the numerical values of the wave motion measuring device as described above, and therefore, it is possible to reduce the influence of the electromagnetic wave generated from the electrical machine or the like, as much as possible. In addition, also when the phase conversion device 10' which is the present invention is attached to the mobile phone, the numerical

TABLE 1

|  | Before experiment A | Use of mobile phone B | Use of mobile phone C When phase conversion device 10 was used by being attached to mobile phone | Use of mobile phone D When phase conversion device 10' was used by being attached to mobile phone | Use of mobile phone E When phase conversion device 10" was used by being attached to mobile phone |
| --- | --- | --- | --- | --- | --- |
| Immunity | 12 | 10 | 15 | 15 | 14 |
| Thymus | 12 | 10 | 14 | 15 | 13 |
| Autonomic nerve | 10 | 7 | 13 | 15 | 15 |
| Sympathetic nerve | 10 | 7 | 13 | 14 | 13 |
| Parasympathetic nerve | 9 | 7 | 14 | 15 | 13 |
| Hypothalamus | 11 | 6 | 15 | 14 | 14 |
| Pituitary gland | 12 | 8 | 13 | 15 | 14 |
| Radiation toxin | 7 | 6 | 15 | 14 | 14 | value in the item of immunity increases to 15. When measurement is performed in each item in this manner, there is almost the same tendency in the numerical values even if there are small differences in the numerical values. In addition, in the case of the phase conversion device 10", the numerical value in the item of immunity also increases to 14. Accordingly, it is considered that the invention of the present application can increase the numerical values of the wave motion measuring device as described above, and therefore, it is possible to reduce the influence of the electromagnetic wave generated from the electrical machine or the like, as much as possible.

The following Table 2 shows measurement values of the wave motion measuring device when a mobile phone was used (for a telephone call) by attaching the phase conversion devices 15, 60, and 70 to the mobile phones.

ingly, similarly to Table 1, the "before experiment A" and the "use of mobile phone B" are numerical values which are measured by the wave motion measuring device for comparison of the effect.

According to the above-described Table 2, similarly to Table 1, the numerical value when the mobile phone is not used is 12. When the mobile phone is used in a state where the phase conversion device is not attached to the mobile phone, the numerical value decreases to 10. In this state, when the phase conversion device 15 which is the present invention is attached to the mobile phone, the numerical value increases to 15. When measurement is performed in each item in this manner, there is almost the same tendency in the numerical values even if there are small differences in the numerical values. Accordingly, it is considered that the invention of the present application can increase the numeri-

TABLE 2

|  | Before experiment A | Use of mobile phone B | Use of mobile phone F When phase conversion device 15 was attached to mobile phone by overlapping two phase conversion devices 10" | Use of mobile phone G When two phase conversion devices 10" were used and phase conversion device 60 in which phase conversion devices 10" were connected to each other through copper foil was used by being attached to mobile phone | Use of mobile phone H When two sets of phase conversion devices 10" were used and phase conversion device 70 in which substance (*Pueraria mirifica*) was interposed therebetween was used by being attached to mobile phone |
| --- | --- | --- | --- | --- | --- |
| Immunity | 12 | 10 | 15 | 15 | 15 |
| Thymus | 12 | 10 | 15 | 15 | 13 |
| Autonomic nerve | 10 | 7 | 14 | 14 | 15 |
| Sympathetic nerve | 10 | 7 | 14 | 14 | 13 |
| Parasympathetic nerve | 9 | 7 | 14 | 14 | 14 |
| Hypothalamus | 11 | 6 | 14 | 14 | 12 |
| Pituitary gland | 12 | 8 | 12 | 12 | 14 |
| Radiation toxin | 7 | 6 | 14 | 14 | 14 |

Here, similarly to Table 1, "before experiment A" in the above-described Table 2 shows numerical values when each item was measured through the wave motion measuring device in a state where a mobile phone as the electrical machine had not been used. In addition, "use of mobile phone B" shows numerical values measured when a mobile phone was used in a state where a phase conversion device had not been attached to the mobile phone. In addition, "use of mobile phone F" shows values measured when a mobile phone was used (for a telephone call) by attaching a phase conversion device 15, in which two phase conversion devices 10" overlap each other, to the mobile phone. Similarly, "use of mobile phone G" shows values measured when two phase conversion devices 10" were used for a mobile phone which was used (for a telephone call) by attaching a phase conversion device 60 in which the phase conversion devices 10" were connected to each other through copper foil. "Use of mobile phone H" shows values measured when two sets of phase conversion devices 10" were used for a mobile phone which was used (for a telephone call) by attaching a phase conversion device 70 in which a substance (*Pueraria mirifica*) was interposed therebetween. Accordcal values of the wave motion measuring device as described above, and therefore, it is possible to reduce the influence of the electromagnetic wave generated from the electrical machine or the like, as much as possible. In addition, also when the phase conversion device 60 which is the present invention is attached to the mobile phone, the numerical value in the item of immunity increases to 15. When measurement is performed in each item in this manner, the numerical values increase and there is almost the same tendency in the numerical values even if there are small differences in the numerical values. In addition, in the case of the phase conversion device 170, the numerical value in the item of immunity also increases to 15. Accordingly, it is considered that the invention of the present application can increase the numerical values of the wave motion measuring device as described above, and therefore, it is possible to reduce the influence of the electromagnetic wave generated from the electrical machine or the like, as much as possible.

The following Table 3 shows measurement values of the wave motion measuring device when a mobile phone was used (for a telephone call) by attaching the phase conversion devices 90 and 95 to the mobile phones.

TABLE 3

|  | Before experiment A | Use of mobile phone B | Use of mobile phone I When phase conversion devices 90 was used | Use of mobile phone J When phase conversion devices 95 was used |
|---|---|---|---|---|
| Immunity | 12 | 10 | 14 | 14 |
| Thymus | 12 | 10 | 13 | 13 |
| Autonomic nerve | 10 | 7 | 15 | 14 |
| Sympathetic nerve | 10 | 7 | 13 | 13 |
| Parasympathetic nerve | 9 | 7 | 13 | 13 |
| Hypothalamus | 11 | 6 | 14 | 13 |
| Pituitary gland | 11 | 8 | 14 | 13 |
| Radiation poison | 7 | 6 | 14 | 13 |

Here, similarly to Table 1, "before experiment A" also in the above-described Table 3 shows numerical values when each item was measured through the wave motion measuring device in a state where a mobile phone as the electrical machine had not been used. In addition, "use of mobile phone B" shows numerical values measured when a mobile phone was used in a state where a phase conversion device had not been attached to the mobile phone. In addition, "use of mobile phone I" shows values measured when a mobile phone was used (for a telephone call) by attaching a phase conversion device 90 to the mobile phone. Similarly, "use of mobile phone J" shows values measured when a mobile phone was used (for a telephone call) by attaching a phase conversion device 95 to the mobile phone.

According to the above-described Table 3, similarly to Table 1, the numerical value when the mobile phone is not used is 12. When the mobile phone is used in a state where the phase conversion device is not attached to the mobile phone, the numerical value decreases to 10. In this state, when the phase conversion device 90 which is the present invention is attached to the mobile phone, the numerical value increases to 14. When measurement is performed in each item in this manner, there is almost the same tendency in the numerical values even if there are small differences in the numerical values. Accordingly, it is considered that the invention of the present application can increase the numerical values of the wave motion measuring device as described above, and therefore, it is possible to reduce the influence of the electromagnetic wave generated from the electrical machine or the like, as much as possible. In addition, also when the phase conversion device 95 which is the present invention is attached to the mobile phone, the numerical value in the item of immunity increases to 14. When measurement is performed in each item in this manner, the numerical values increase and there is almost the same tendency in the numerical values even if there are small differences in the numerical values. Accordingly, it is considered that the invention of the present application can increase the numerical values of the wave motion measuring device as described above, and therefore, it is possible to reduce the influence of the electromagnetic wave generated from the electrical machine or the like, as much as possible.

The following Table 4 shows measurement values of the wave motion measuring device when a mobile phone, which was not attached with phase conversion devices 10'' 15, 60, and 90, was used (for a telephone call) in a state where the phase conversion devices 10'' 15, 60, and 90 were separated from the mobile phone by 25 cm.

TABLE 4

|  | Before experiment A | Use of mobile phone B | Use of mobile phone K When phase conversion device 10'' was separated from mobile phone by 25 cm | Use of mobile phone L When phase conversion device 15 was separated from mobile phone by 25 cm | Use of mobile phone M When phase conversion device 60 was separated from mobile phone by 25 cm | Use of mobile phone N When phase conversion device 90 was separated from mobile phone by 25 cm |
|---|---|---|---|---|---|---|
| Immunity | 12 | 10 | 14 | 14 | 14 | 14 |
| Thymus | 12 | 10 | 11 | 13 | 14 | 13 |
| Autonomic nerve | 10 | 7 | 14 | 14 | 13 | 14 |
| Sympathetic nerve | 10 | 7 | 12 | 12 | 12 | 13 |
| Parasympathetic nerve | 9 | 7 | 12 | 13 | 14 | 13 |
| Hypothalamus | 11 | 6 | 12 | 12 | 14 | 13 |
| Pituitary gland | 12 | 8 | 13 | 14 | 13 | 13 |
| Radiation toxin | 7 | 6 | 13 | 14 | 13 | 13 |

Here, similarly to Table 1, "before experiment A" also in the above-described Table 4 shows numerical values when each item was measured through the wave motion measuring device in a state where a mobile phone as the electrical machine had not been used. In addition, "use of mobile phone B" shows numerical values measured when a mobile phone was used in a state where there is no phase conversion device. In addition, "use of mobile phone K" shows values measured when a mobile phone which is not attached with a phase conversion device 10", was used (for a telephone call) while the phase conversion device 10" was separated from the mobile phone by 25 cm. Similarly, "uses of mobile phone L, M, and N" respectively show values measured when mobile phones, which were not attached with phase conversion devices 15, 60, and 90, were used (for a telephone call) while the phase conversion devices 15, 60, and 90 were separated from the mobile phones by 25 cm.

According to the above-described Table 4, similarly to Table 1, the numerical value when the mobile phone is not used is 12. When the mobile phone is used in a state where there is no phase conversion device, the numerical value decreases to 10. Here, when a mobile phone, which was not attached with the phase conversion device 10", was used in a state where only the phase conversion device 10" was separated from the mobile phone by 25 cm, the numerical value of immunity increases to 14. When measurement is performed in each item in this manner, the numerical values increase, and there is almost the same tendency in the numerical values even if there are small differences in the numerical values. Accordingly, it is considered that the invention of the present application can increase the numerical values of the wave motion measuring device as described above, and therefore, it is possible to reduce the influence of the electromagnetic wave generated from the electrical machine or the like, as much as possible. Similarly, the numerical values in each item increase to 14 even when a mobile phone is used in a state where each of the phase conversion devices 15, 60, and 90 is separated from the mobile phone by 25 cm. When measurement is performed in each item in this manner, the numerical values increase and there is almost the same tendency in the numerical values even if there are small differences in the numerical values. Accordingly, it is considered that the invention of the present application can increase the numerical values of the wave motion measuring device even in the state where the device is separated from the electrical machine as described above, and therefore, it is possible to reduce the influence of the electromagnetic wave generated from the electrical machine or the like, as much as possible.

In Table 5, a phase conversion device 95 is attached to a smart phone of electrical machines, and they are placed at a position separated from a mobile phone by 2 meters. Then, measurement was performed using the wave motion measuring device in a state where a telephone call was made using a mobile phone which was not attached with a phase conversion device, and the results are shown in FIG. 5.

|  | Before experiment A | Use of mobile phone B | Use of mobile phone O Phase conversion device 95 is attached to smart phone, and telephone call was made using another mobile phone while phase conversion device-attached smart phone was separated from mobile phone by 2 meters |
|---|---|---|---|
| Immunity | 12 | 10 | 12 |
| Thymus | 12 | 10 | 12 |
| Autonomic nerve | 10 | 7 | 12 |
| Sympathetic nerve | 10 | 7 | 13 |
| Parasympathetic nerve | 9 | 7 | 11 |
| Hypothalamus | 11 | 6 | 13 |
| Pituitary gland | 12 | 8 | 13 |
| Radiation toxin | 7 | 6 | 14 |

Here, similarly to Table 1, "before experiment A" in the above-described Table 5 shows numerical values when each item was measured through the wave motion measuring device in a state where a mobile phone as the electrical machine had not been used. In addition, "use of mobile phone B" shows numerical values measured when a mobile phone was used in a state where there is no phase conversion device. In "use of mobile phone O", the phase conversion device 95 was attached to a smart phone as an electrical machine separately from a mobile phone while using the mobile phone (for a telephone call) in a state of not being attached with a phase conversion device. Measurement was performed in a state where the smart phone attached with the phase conversion device 95 was separated from the mobile phone by 2 meters which is being used (for a telephone call). It can be confirmed that there was effect of the phase conversion device 95 even in the position at which the smart phone was separated from the mobile phone, in the state of not being attached with the phase conversion device while a telephone call was being made, by 2 meters in the state where the phase conversion device 95 was attached to the smart phone.

In the device of the present invention, it is considered that the phases of the electromagnetic waves are converted by the phase conversion devices 10, 10', 10", 60, 70, 80, 90, and 95. In addition, the phase conversion device is preferably attached to an electrical machine such as a mobile phone, but is also preferably disposed at a position which is separated from the mobile phone. In addition, it is possible to exhibit an effect of reducing electromagnetism by attaching the phase conversion device to a body. Furthermore, it is considered that it is possible to change an electromagnetic wave into a converted right-handed or left-handed circularly polarized wave by incorporating the phase conversion device into a machine which outputs the electromagnetic wave.

The device of the present invention which is constituted in this manner can attenuate or remove electric and magnetic influences which are affected by an electromagnetic wave of a subject by acting on the electromagnetic wave generated from an electrical machine, through attachment of the device to a human body or the electrical machine or disposition of the device near the machine which generates the electromagnetic wave. Accordingly, the device may convert the electromagnetic wave by disposing the device to an office, a home, a clinic, a hospital, or the like. In addition, use of an antenna may have an effect in a wide range.

INDUSTRIAL APPLICABILITY

Various application methods of the device of the present invention are considered. It is preferable that the above-described conversion device is attached to an oscillation circuit or the like which generates an electromagnetic wave. Furthermore, it is possible to use a wavelength plate. It is possible to reduce electric and magnetic influences at relatively low cost by replacing the wavelength plate with a transparent member such as OPP tape or the like.

BRIEF DESCRIPTION OF THE DRAWINGS

Figure 1:
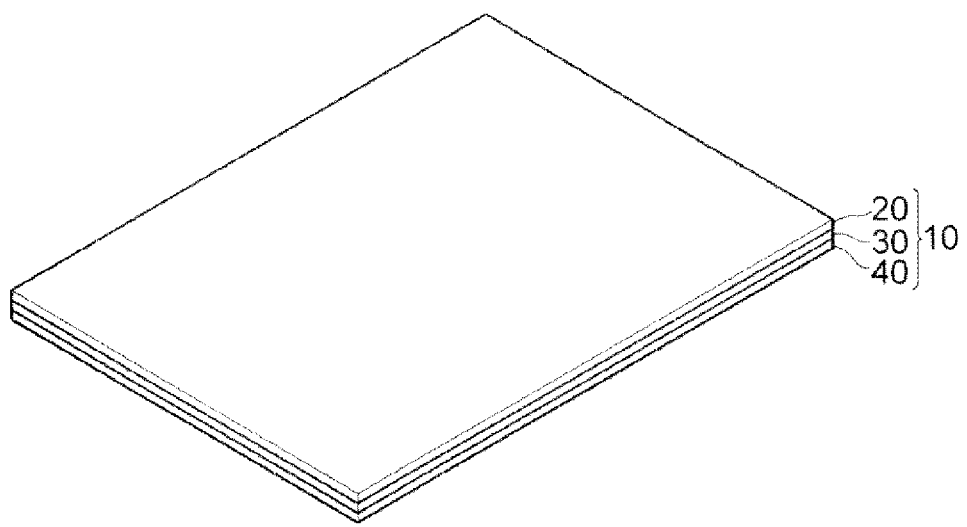
FIG. 1 is a perspective view of a phase conversion device for an electromagnetic wave according to the present invention.

FIG. 1 is a perspective view of a phase conversion device for an electromagnetic wave according to the present invention.

A of FIG. 2 is a perspective view of another example of a phase conversion device for an electromagnetic wave according to the present invention.

B of FIG. 2 is a state view in which a sheet is drawn from a roll.

C of FIG. 2 is a perspective view of a transparent member.
D of FIG. 2 is a perspective view of a transparent member.
A of FIG. 3 is a perspective view of still another example of a phase conversion device for electromagnetic wave according to the present invention.

B of FIG. 3 is a state view in which a sheet is drawn from a roll.

C of FIG. 3 is a perspective view of a transparent member.
D of FIG. 3 is a perspective view of a transparent member.
E of FIG. 3 is a perspective view of a transparent member.
FIG. 4 is a perspective view of still another example of a phase conversion device for an electromagnetic wave according to the present invention.

FIG. 5 is a perspective view of an example in which phase conversion devices for electromagnetic waves according to the present invention are connected to each other through a conductive wire.

A of FIG. 6 is a perspective view of an example in which phase conversion devices for electromagnetic waves according to the present invention are connected to each other through a conductive wire and a substance is disposed between the phase conversion devices.

B of FIG. 6 is a cross-sectional view taken along line A-A in A of FIG. 6.

A of FIG. 7 is a perspective view of still another example of a phase conversion device for an electromagnetic wave according to the present invention.

B of FIG. 7 is a side surface view of A of FIG. 7.
A of FIG. 8 is a perspective view of a phase conversion device of still another example.

B of FIG. 8 is a perspective view on a rear side of the phase conversion device of the still another example.

C of FIG. 8 is a cross-sectional view taken along line A-A of A of FIG. 8.

DESCRIPTION OF REFERENCE NUMERALS AND SIGNS

10, 10', 10", phase conversion device
15 phase conversion device
20, ½ lambda wavelength plate
20' transparent member
30, ¼ lambda wavelength plate
30' transparent member
40, ½ lambda wavelength plate
40' transparent member
50 conductive wire portion
51 wire portion
52 fixing portion
60 phase conversion device
70 phase conversion device
80 substance
90 phase conversion device
91 placement portion
92 placement portion
95 phase conversion device

The invention claimed is:

1. A phase conversion device that converts an electromagnetic wave into a right-handed circularly polarized wave and a left-handed circularly polarized wave to reduce electric and magnetic influences, the device comprising:
    a first layer that includes a ½ lambda wavelength plate;
    a second layer that includes a ¼ lambda wavelength plate; and
    a third layer that includes a ½ lambda wavelength plate.

2. The phase conversion device according to claim 1, wherein each of the first layer and the third layer is formed of a transparent member.

3. The phase conversion device according to claim 1, wherein each of the first layer, the second layer, and the third layer is formed of a transparent member.

4. The phase conversion device according to claim 3, wherein the phase conversion device is connected to a same other phase conversion device by a conductive wire portion connecting the first layer of the phase conversion device with a first layer of the same other phase conversion device.

5. The phase conversion device according to claim 3,
    wherein the phase conversion device is connected to a same other phase conversion device by a conductive wire portion connecting the first layer of the phase conversion device with a first layer of the same other phase conversion device, and
    wherein a substance is disposed between the phase conversion device and the same other phase conversion device.

6. The phase conversion device according to claim 3, further comprising a placement portion disposed on an upper portion of the phase conversion device, the placement portion being formed of a conductor.

\* \* \* \* \*